(12) United States Patent
Chen et al.

(10) Patent No.: US 8,863,029 B2
(45) Date of Patent: Oct. 14, 2014

(54) METHOD AND SYSTEM FOR PROVIDING GRAPHICAL USER INTERFACE HAVING FILTERING CAPABILITY

(75) Inventors: Chun-Yi Chen, Belmont, CA (US);
Aylin Uysal, Redwood City, CA (US);
Sally Baggett, Healdsburg, CA (US);
Lulit Bezuayehu, Oakland, CA (US);
Aaron Joseph Green, San Francisco, CA (US); Julian Challenger, Reading (GB)

(73) Assignee: Oracle International Corporation, Redwood Shores, CA (US)

( * ) Notice: Subject to any disclaimer, the term of this patent is extended or adjusted under 35 U.S.C. 154(b) by 1046 days.

(21) Appl. No.: 12/563,085

(22) Filed: Sep. 18, 2009

(65) Prior Publication Data

US 2011/0055756 A1  Mar. 3, 2011

Related U.S. Application Data

(60) Provisional application No. 61/239,040, filed on Sep. 1, 2009.

(51) Int. Cl.
*G06F 3/048* (2013.01)
*G06F 3/0482* (2013.01)
*G06F 17/30* (2006.01)

(52) U.S. Cl.
CPC .................................. *G06F 3/0482* (2013.01); *G06F 17/30398* (2013.01)
USPC ........... 715/810; 715/713; 715/817; 715/818; 715/853

(58) Field of Classification Search
CPC .................................................... G06F 3/0482
USPC .......... 715/711, 713, 810, 817, 818, 853–855
See application file for complete search history.

(56) References Cited

U.S. PATENT DOCUMENTS

| 5,798,769 | A | 8/1998 | Chiu et al. |
| 5,850,221 | A | 12/1998 | Macrae et al. |
| 5,937,163 | A | 8/1999 | Lee et al. |

(Continued)

FOREIGN PATENT DOCUMENTS

| WO | WO 2005/084285 A2 | 9/2005 |
| WO | WO 2007/111951 A2 | 10/2007 |
| WO | WO 2008/042677 A2 | 10/2008 |

OTHER PUBLICATIONS

U.S. Appl. No. 12/490,250, filed Jun. 23, 2009, Chen et al.

(Continued)

*Primary Examiner* — Tadeese Hailu
(74) *Attorney, Agent, or Firm* — Kilpatrick Townsend & Stockton LLP (57) ABSTRACT

Embodiments of the present invention are directed to user interfaces and more particularly to techniques for providing user interface which allows users to select filtering criteria and display filtered information accordingly. In various embodiments, related information is displayed on a hierarchical chart as nodes that are connected to one another. The hierarchical chart is updated after filtering criteria are applied, and the display visibility of the nodes are changed based on the filtering results. The hierarchical relationships among the nodes are maintained before and after the filtering process. In a specific embodiment, the nodes that do not meet filtering criteria are displayed at a low visibility level on the hierarchical chart.

21 Claims, 9 Drawing Sheets

(56) References Cited

U.S. PATENT DOCUMENTS

| | | | |
|---|---|---|---|
| 5,953,724 | A | 9/1999 | Lowry |
| 6,128,617 | A | 10/2000 | Lowry |
| 6,154,750 | A | 11/2000 | Roberge et al. |
| 6,259,451 | B1 | 7/2001 | Tesler |
| 6,496,208 | B1 | 12/2002 | Bernhardt et al. |
| 6,732,114 | B1 | 5/2004 | Aamodt et al. |
| 6,816,175 | B1* | 11/2004 | Hamp et al. ............ 715/854 |
| 6,859,823 | B1 | 2/2005 | Nishihara et al. |
| 6,944,830 | B2 | 9/2005 | Card et al. |
| 6,990,638 | B2 | 1/2006 | Barksdale et al. |
| 7,080,077 | B2 | 7/2006 | Ramamurthy et al. |
| 7,131,069 | B1 | 10/2006 | Rush et al. |
| 7,149,959 | B1 | 12/2006 | Jones et al. |
| 7,152,207 | B1 | 12/2006 | Underwood et al. |
| 7,363,593 | B1 | 4/2008 | Loyens et al. |
| 7,412,647 | B2 | 8/2008 | Sellers et al. |
| 7,574,659 | B2 | 8/2009 | Szabo |
| 7,603,632 | B1 | 10/2009 | Aamodt et al. |
| 7,743,077 | B2 | 6/2010 | Gaurav |
| 7,802,174 | B2* | 9/2010 | Teng et al. ............ 715/200 |
| 8,161,413 | B2 | 4/2012 | Chen et al. |
| 8,190,710 | B2 | 5/2012 | Chen et al. |
| 8,205,171 | B2 | 6/2012 | Chen et al. |
| 2003/0218640 | A1 | 11/2003 | Noble-Thomas |
| 2004/0169688 | A1 | 9/2004 | Burdick et al. |
| 2004/0205594 | A1 | 10/2004 | Arora |
| 2004/0230917 | A1* | 11/2004 | Bales et al. ............ 715/854 |
| 2005/0050477 | A1* | 3/2005 | Robertson et al. ............ 715/853 |
| 2005/0071765 | A1 | 3/2005 | Hallisey et al. |
| 2005/0108260 | A1 | 5/2005 | Wenn et al. |
| 2005/0120005 | A1 | 6/2005 | Tesch et al. |
| 2005/0165766 | A1 | 7/2005 | Szabo |
| 2005/0262192 | A1 | 11/2005 | Mamou et al. |
| 2006/0001647 | A1 | 1/2006 | Carroll |
| 2006/0150169 | A1 | 7/2006 | Cook et al. |
| 2006/0169688 | A1 | 8/2006 | Mori et al. |
| 2006/0195575 | A1* | 8/2006 | Delany et al. ............ 709/225 |
| 2007/0011316 | A1 | 1/2007 | Araki et al. |
| 2007/0100848 | A1 | 5/2007 | Vignet |
| 2007/0174160 | A1* | 7/2007 | Solberg et al. ............ 705/35 |
| 2007/0185904 | A1* | 8/2007 | Matsuzawa et al. ........ 707/104.1 |
| 2008/0028338 | A1 | 1/2008 | Kodosky et al. |
| 2008/0091441 | A1* | 4/2008 | Flammer et al. ............ 705/1 |
| 2008/0162616 | A1 | 7/2008 | Gross |
| 2009/0070337 | A1 | 3/2009 | Romem et al. |
| 2009/0113350 | A1* | 4/2009 | Hibino et al. ............ 715/853 |
| 2009/0144606 | A1* | 6/2009 | Vignet ............ 715/227 |
| 2009/0164946 | A1* | 6/2009 | Liddington ............ 715/853 |
| 2010/0287512 | A1 | 11/2010 | Gan et al. |
| 2010/0325198 | A1 | 12/2010 | Chen et al. |
| 2010/0332582 | A1 | 12/2010 | Chen et al. |
| 2011/0055755 | A1 | 3/2011 | Chen et al. |
| 2011/0055767 | A1 | 3/2011 | Chen et al. |
| 2011/0055768 | A1 | 3/2011 | Chen et al. |
| 2011/0055771 | A1 | 3/2011 | Chen et al. |
| 2012/0174040 | A1 | 7/2012 | Chen et al. |

OTHER PUBLICATIONS

U.S. Appl. No. 12/492,084, filed Jun. 23, 2009, Chen et al.
U.S. Appl. No. 12/563,069, filed Sep. 18, 2009, Chen et al.
U.S. Appl. No. 12/563,071, filed Sep. 18, 2009, Chen et al.
U.S. Appl. No. 12/563,075, filed Sep. 18, 2009, Chen et al.
U.S. Appl. No. 12/563,082, filed Sep. 18, 2009, Chen et al.
"AA OrgChart Webpart." at URL: http://www.aasoftech.com/Products/OrgChartwebpart/Default.asp, downloaded Nov. 20, 2008; Copyright 1997-2007, AASoftech Inc, 1 page.
"Chapter 2: A Tutorial Introduction to Leo," at URL: http://webpages.charter.net.edramleo/intro.html#clones-views, downloaded Nov. 17, 2008, 4 pages.
"Create multiple Views with on one node with paging," Jan. 5, 2008, at URL: http://drupal.org/node/85720, downloaded Nov. 17, 2008, 3 pages.
"Different Context Menus depending on selected Node in Tree View-Xtreme Visual Basic Talk," at URL: http://www.xtremevbtalk.com/showthread.php?t=85288, downloaded Nov. 18, 2008, 3 pages.
Dill et al., "A Continuously Variable Zoom for Navigating Large Hierarchical Networks," at URL: http://ieeexplore.ieee.org/Xplore/login.jsp?url=/iel2/3184/9019/00399869.pdf?temp=x, 1994, 5 pages.
"Discussion Forum: Ittoolbox Groups Regarding to organization chart in asp.net" at URL: http://c.ittoolbox.com/groups/technical-functional/csharp-1/regarding-to-organization-chart-in-aspnet-2191857, downloaded Nov. 20, 2008, Copyright 1998-2008, CEB Toolbox, Inc., 2 pages.
"Global View Mode," http://www.ilog.com/documentation/elixir10/en-US/Content/Visualization/Documentation/Elixir/_pubskel/ps_elixir82.html, downloaded Nov. 20, 2008; Copyright 1987-2008, ILOG S.A, 3 pages.
"Google Organizational Charts," Cogmap, at URL: http://www.cogmap.com/chart/google, downloaded Nov. 13, 2008, 5 pages.
"Grouping Data in a Report" at URL: http://msdn.microsoft.com/en-us/library/ms155903(SQL.90).aspx, downloaded Nov. 20, 2008, Copyright 2008, Microsoft Corporation, 2 pages.
"How to Draw Organizational Charts," EDrawsoft, at URL: http://www.edrawsoft.com/How-to-draw-org-charts.php, Copyright 2004-2008, EDrawSoft downloaded Nov. 13, 2008, 2 pages.
"INAPORT Enterprise Data Integration for GoldMine," at URL: http://www.databridgenow.com/what_we_do/inaport.pdf, InaPlex Limited 2002, 6 pages.
"InfoPath Team Blog: recursive Controls support in Infopath," 2003 SP1 at URL: http://blogs.msdn.com/infopath/archive/2004/06/24/164988.aspx;copy, downloaded Dec. 15, 2008, Copyright 2008, Microsoft Corporation, 4 pages.
"Integrated Multi-Views," Journal of Visual Languages & Computing, Abstract, Jun. 1998, vol. 9, Issue 3, at URL: http://www.sciencedirect.com/science?_ob=ArticleURL&_udi=B6WMM-45J5BMS-P&_user=10&rdoc=1&_fmt=&orig=search&_sort=d&view=c&_acct=C000050221&_version=1&_urlVersion=0&_userid=10&md5=b16ea573128ea20191cc62fa49df0c46, Copyright 1998, Academic Press, 2 pages.
"JSF portlet with JWL Data Tree Component," at URL: http://www.ibm.com/developerworks/forums/thread.jspa?threadID=161906, downloaded Nov. 18, 2008, 4 pages.
"KNIME Quick Start Guide," at URL: http://www.knime.org/quickstartguide.html, downloaded Nov. 17, 2008; Copyright 2003-2008, University of Konstanz, Germany,10 pages.
"KWizCom Organization Chart web part Installation & User Guide" Copyright 2005, KWizCom LTD, pp. 1-22.
"McGill Organizational Chart" McGill Organizational Chart Manual—Version 2 Aug. 2005; 11 pages.
Nation et al., "Browse Hierarchical Data with the Degree of Interest Tree," at URL: http://www2.parc.com/istl/groups/uir/publications/items/UIR-2002-12-Nation-CHI2002-DOIDemo.pdf, downloaded 2008, 2 pages.
"Organization Chart," at URL: http://www.aasoftech.com/Demo1/3LevelChart.htm, downloaded Feb. 2, 2011; 1 page.
"Organization charts from Office 2000 programs appear different in Office XP programs," at URL: http://support.microsoft.com/kb/293615, downloaded Nov. 20, 2008; Copyright 2008, Microsoft, 4 pages.
"Organization Chart" http://www.12manage.com/methods_organization_chart.html, downloaded Nov. 20, 2008 Copyright 2008 12manage, 3 pages.
"Organization Chart," at URL: http://www.longbowcg.com/home/services/downloads/coursewarevol2pdf.pdf, downloaded on or before Oct. 2010, 5 pages.
"OrgPlus Professional Tour: 7. Automatically format charts based on the data they contain" at URL: http://www.orgplus.com/products/orgplus-professional/orgplus-professional-tour.htm#, downloaded Nov. 17, 2008, 2000-2008, Copyright HumanConcepts. 1 page.
"OrgPlus Professional Tour: 6. Show chart data in multiple views" at URL:http://www.orgplus.com/products/orgplus-professional/orgplus-professional-tour.htm#, downloaded Nov. 20, 2008, Copyright 2000-2008, HumanConcepts, 1 page.
OrgPlus Professional Tour 5. Create multiple customized chart views to present employee data differently, at URL:http://www.orgplus.

(56) References Cited

OTHER PUBLICATIONS com/products/orgplus-professional/orgplus-professional-tour.htm#, downloaded Nov. 20, 2008, 2000-2008, Copyright HumanConcepts, 2 pages.
"Org Chart Test" at URL: http://sandpit.reitsma.net.au/googleOrg/OrgChartTest.html; downloaded Dec. 15, 2008, 1 page.
Perkins, "Create and organizational chart with HTML, VML, and XML," downloaded Dec. 15, 200, 3 pages.
"1. Portal Tour-Chapter 2. User Guide," at URL: http://www.polarion.com/products/alm/help/ug_quicktour.html, downloaded Nov. 20, 2008; 9 pages.
Plumlee et al.,"Zooming, Multiple Windows, and Visual Working Memory," at URL: http://ccom.unh.edu/vislab/PDFs/Zoom_Multi_VisualWM_final.pdf, 2008; 10 pages.
"Quixa Organisation Chart," at URL: http://www.quixa.com/bpmsuite/orgchart.asp, downloaded Nov. 20, 2008; Copyright 2008, Qiuxa Solutions, 1 page.
"QMF_V8-DB2 QMF Visionary Developer's Guide—Organization chart example," http://publib.boulder.ibm.com/infocenter/dzichelp/v2r2/index.jsp?topic=/com.ibm.qmf.doc.visd.dsqvdmst50.htm, downloaded Nov. 13, 2008, Copyright 1982, 2004, IBM Corporation 3 pages.
"Readerware views," at URL: http://www.readerware.com/help/rwViews.html, downloaded Nov. 20, 2008, Copyright 1999-2008, Readerware Corporation, 3 pages.
"Sage Abra OrgPlus Professional" Copyright 2007, Sage Software, 2 pages.
"Support Organization Chart" at URL: http://resources2.visual-paradigm.com/index.php/release-vp33/55-vp33/91-org-chart.pdf, Last updated Aug. 11, 2008, 5 pages.
Schaffer et al., at URL: "Navigating Hierarchically Clustered Networks Through Fisheye and Full-Zoom Methods," Fisheye versus Full Zoom Views, Mar. 24, 1998, pp. 1-20.
Stolte et al., "Multiscale Visualization Using Data Cubes," at URL: http://graphics.stanford.edu/papers/pan_zoom/paper.pdf, downloaded 2008, 8 pages.
TreeTable—Java applet combines grid and tree view, at URL: http://www.advancescripts.com/detailed/3201.html, downloaded Nov. 20, 2008, Copyright 2006, AdvanceScripts™, 2 pages.
"TreeView Nodes and ContextMenuStrip" at URL:http://www.devnewsgroups.net/group/microsoft.public.dotnet.framework.windowsforms/topic53850.aspx, downloaded Nov. 18, 2008, 5 pages.
"The Most Trusted Name in Enterprise Organizational Charting and Reporting," OrgPublisher, at URL:http://www.ilog.com/documentation/elixir10/enUS/Content/Visualization/Documentation/Elixir/_pubskel/ps_elixir82.html, downloaded Nov. 20, 2008, 2 pages.
"Understanding Data Graph Window Areas," at URL:http://docs.hp.com/en/B6454-97413/ch08s02.html, downloaded Nov. 18, 2008; Hewlett-Packard Development Company 2000, L.P, 3 pages.
"Welcome to Defura Infotech! Dynamic Org chart and Form Designer Tools," at URL: http://jayankv.com/OrgChartDetails.aspx, downloaded Nov. 13, 2008, Copyright 2007, Defure Infotech, 3 pages.
Zhao et al., "Elastic Hierarchies: Combining Treemaps and Node-Link Diagrams," at URL:http://www.dgp.toronto.edu/~sszhao/paperInforVis05_ElasticHierarchy.pdf, downloaded 2008, 8 pages.
OrgPublisher http://www.orgpublisher.com/docs/pdf/v8/OP8_datasheet.pdf, downloaded on or before Oct. 2010.
U.S. Appl. No. 12/563,069, filed Sep. 18, 2009, Notice of Allowance mailed Dec. 15, 2011, 9 pages.
U.S. Appl. No. 12/563,071, filed Sep. 18, 2009, Notice of Allowance mailed Mar. 8, 2012, 8 pages.
U.S. Appl. No. 12/563,075, filed Sep. 18, 2009, Office Action mailed Jan. 24, 2012, 13 pages.
U.S. Appl. No. 12/563,082, filed Sep. 18, 2009, Office Action mailed Jan. 25, 2012, 12 pages.
U.S. Appl. No. 12/490,250, filed Jun. 23, 2009, Notice of Allowance mailed Feb. 3, 2012, 8 pages.
U.S. Appl. No. 12/490,250, filed Jun. 23, 2009, Office Action mailed Sep. 28, 2011, 4 pages.
U.S. Appl. No. 12/490,250, filed Jun. 23, 2009, Office Action mailed Apr. 1, 2011, 8 pages.
U.S. Appl. No. 12/492,084, filed Jun. 25, 2009, Office Action mailed Feb. 13, 2012, 10 pages.
U.S. Appl. No. 12/563,075, filed Sep. 18, 2009, Final Office Action mailed May 25, 2012, 15 pages.
U.S. Appl. No. 12/563,082, filed Sep. 18, 2009, Final Office Action mailed May 29, 2012, 13 pages.
U.S. Appl. No. 12/563,082, filed Sep. 18, 2009, Advisory Action mailed Aug. 17, 2012, 3 pages.
U.S. Appl. No. 13/459,447, filed Apr. 30, 2012, Non-Final Office Action mailed Jun. 22, 2012, 9 pages.
U.S. Appl. No. 13/459,447, filed Apr. 30, 2012,Terminal Disclaimer—Approved mailed Sep. 28, 2012, 1 pages.
U.S. Appl. No. 13/459,447, filed Apr. 30, 2012, Notice of Allowance mailed Oct. 16, 2012, 29 pages.
U.S. Appl. No. 12/492,084, filed Jun. 25, 2009, Notice of Allowance mailed Aug. 2, 2012, 5 pages.

\* cited by examiner

METHOD AND SYSTEM FOR PROVIDING GRAPHICAL USER INTERFACE HAVING FILTERING CAPABILITY

CROSS-REFERENCES TO RELATED APPLICATIONS

The present applications claims priority to U.S. Provisional Application No. 61/239,040, filed Sep. 1, 2009, which is commonly owned and incorporated by reference herein for all purposes.

BACKGROUND OF THE INVENTION

Embodiments of the present invention are directed to user interfaces and more particularly to techniques for providing user interface which allow users to select filtering criteria and display filtered information accordingly.

In today's information age, an increasing amount of data is being collected and stored every second. Satellites orbiting earth record information and photograph our planet everyday, and they send the information and photographs back to earth. Millions of computers on the Internet collect all types of information, ranging from network usage to marketing data. All types of organizations, large and small, store information such as personnel data, operational costs, etc. New tools are being invented to make collecting data easier, faster, and more convenient than ever before.

Data, no matter how it is collected, is only meaningful and useful to people when logically organized and stored. For example, computers often rely on data structures to store data in predefined fields. For large amounts of data, people usually rely on databases, where structured collections of data and/or records are stored in computer systems in accordance to predefined rules and/or database models.

Relationship models, hierarchy models, and network models, are common models for use in databases representing relationships among entities of information stored in databases. Typically, a database relies on database software to organize and manage data and/or entities of information. For example, database software organizes, stores, and/or records data using various types of database models.

Graphical user interface ("GUI") is a helpful way for displaying data and showing the relationships thereof. Numerous conventional graphical interfaces are capable of displaying information in a hierarchical view. Unfortunately, merely being able to see information in a hierarchical view is often not enough, as it may be difficult to identify which parts of the information are of interest.

Therefore, new and improved graphical user interfaces for displaying hierarchical information are desired.

BRIEF SUMMARY OF THE INVENTION

Embodiments of the present invention are directed to user interfaces and more particularly to techniques for providing user interface which allow users to select filtering criteria and display filtered information accordingly. In various embodiments, related information is displayed on a hierarchical chart as nodes that are connected to one another. The hierarchical chart is updated after filtering criteria are applied, and the display visibility of the nodes is changed based on the filtering results. The hierarchical relationships among the nodes are maintained before and after the filtering process. In a specific embodiment, the nodes that do not meet filtering criteria are displayed at a low visibility level on the hierarchical chart. There are other embodiments as well.

According to an embodiment, the present invention provides a computer-readable storage medium storing a plurality of codes for controlling a processor to provide a graphical user interface. The plurality of codes includes code for obtaining information containing relationship data associated with entities represented as nodes of a hierarchical chart, each of the nodes associated with a plurality of attributes. The plurality of codes includes code for receiving the first filtering criterion, the first filter criterion being associated with at least a first attribute. The plurality of codes includes code for displaying the hierarchical chart in a display region, the hierarchical chart based on at least the relationship data, each of the nodes being displayed at a first visibility level, the hierarchical chart including one or more links connecting the nodes, the one or more links being based on the relationship data. The plurality of codes includes code for processing a first user input received by a user interface device, the first user selecting at least a first filtering criterion. The plurality of codes includes code for processing the plurality of nodes. The plurality of codes includes code for comparing the plurality of nodes to at least the first attribute. The plurality of codes includes code for determining whether one or more nodes are associated with at least the first attribute. The plurality of codes includes code for displaying the one or more nodes at a second visibility level on the hierarchical chart if the one or more nodes are determined to fail to associate with at least the first attribute, the second visibility level being characterized by a lowered visibility compared to the first visibility level.

According to another embodiment, the present invention provides a computer system for providing an interactive graphical user interface. The system includes a graphical user interface including a display, the display including a menu region and a display region within the graphical user interface, the menu region including a filtering menu, the filtering menu including selections for at least a first filtering criterion, the first filtering criterion being associated with at least a first attribute, the display region being adapted to display a plurality of nodes of a hierarchical chart at a first visibility level based on relationship data, the plurality of nodes being connected by one or more links based on the relationship data, the plurality of nodes being associated with a plurality of attributes. The system also includes a memory. The system includes an input module for receiving user inputs, the input module being configured to receive a user selection for selecting the first filtering criterion from the filtering menu. The system further includes a processor, the processor being configured to obtain nodes and process the user input to determine whether one or more nodes fail to associate with at least the first attribute. The display region is updated to display the one or more nodes at a second visibility level on the hierarchical chart if the one or more nodes are determined to fail to associate with at least the first attribute, the second visibility level being characterized by a lowered visibility compared to the first visibility level.

According to yet another embodiment, the present invention provides a graphical user interface in a computer system having a processor. The graphical user interface includes a display and a user interface device communicatively coupled to the processor. The graphical user interface includes a display region within the graphical user interface, the display region being adapted to display one or more links and a plurality nodes of a hierarchical chart at a first visibility level based on at least relationship data, the relationship data associated with the plurality of nodes, the plurality of nodes being associated with a plurality of attributes. The graphical user interface includes a menu region, the menu region including a filtering menu, the filtering menu including selections for at least a first filtering criterion, the first filter criterion being associated with at least a first attribute. The user interface device is configured to receive a first user input, the first user selecting the first filtering criterion. The processor is configured to process the plurality of nodes and compare the plurality of nodes to at least the first attribute. The display region is updated for displaying one or more nodes at a second visibility level on the hierarchical chart if the one or more nodes are determined to fail to associate with at least the first attribute, the second visibility level being characterized by a lowered visibility compared to the first visibility level.

It is appreciated that the present invention provides many other embodiments as well.

DETAILED DESCRIPTION OF THE INVENTION

Embodiments of the present invention are directed to user interfaces and more particularly to techniques for providing user interface which allow users to select filtering criteria and display filtered information accordingly. In various embodiments, related information is displayed on a hierarchical chart as nodes that are connected to one another. The hierarchical chart is updated after filtering criteria are applied, and the display visibility of the nodes is changed based on the filtering results. The hierarchical relationships among the nodes are maintained before and after the filtering process. In a specific embodiment, the nodes that do not meet filtering criteria are displayed at a low visibility level on the hierarchical chart.

As explained above, conventional techniques are available for filtering information, however, the conventional filtering processes are often inadequate because the filtered information often fails to show its relationship to other types of information. For example, when a filtering process is performed, only information items that meet filtering criteria are displayed, the information items that do not meet the filtering criteria are not displayed. From a user's perspective, it is often difficult to understand the relationship between the information items that meet the filtering criteria and those that do not. It is therefore to be appreciated that embodiments of the present invention present information in the form of a hierarchical chart and display filtered information while preserving the hierarchical relationship that is displayed.

Figure 1:
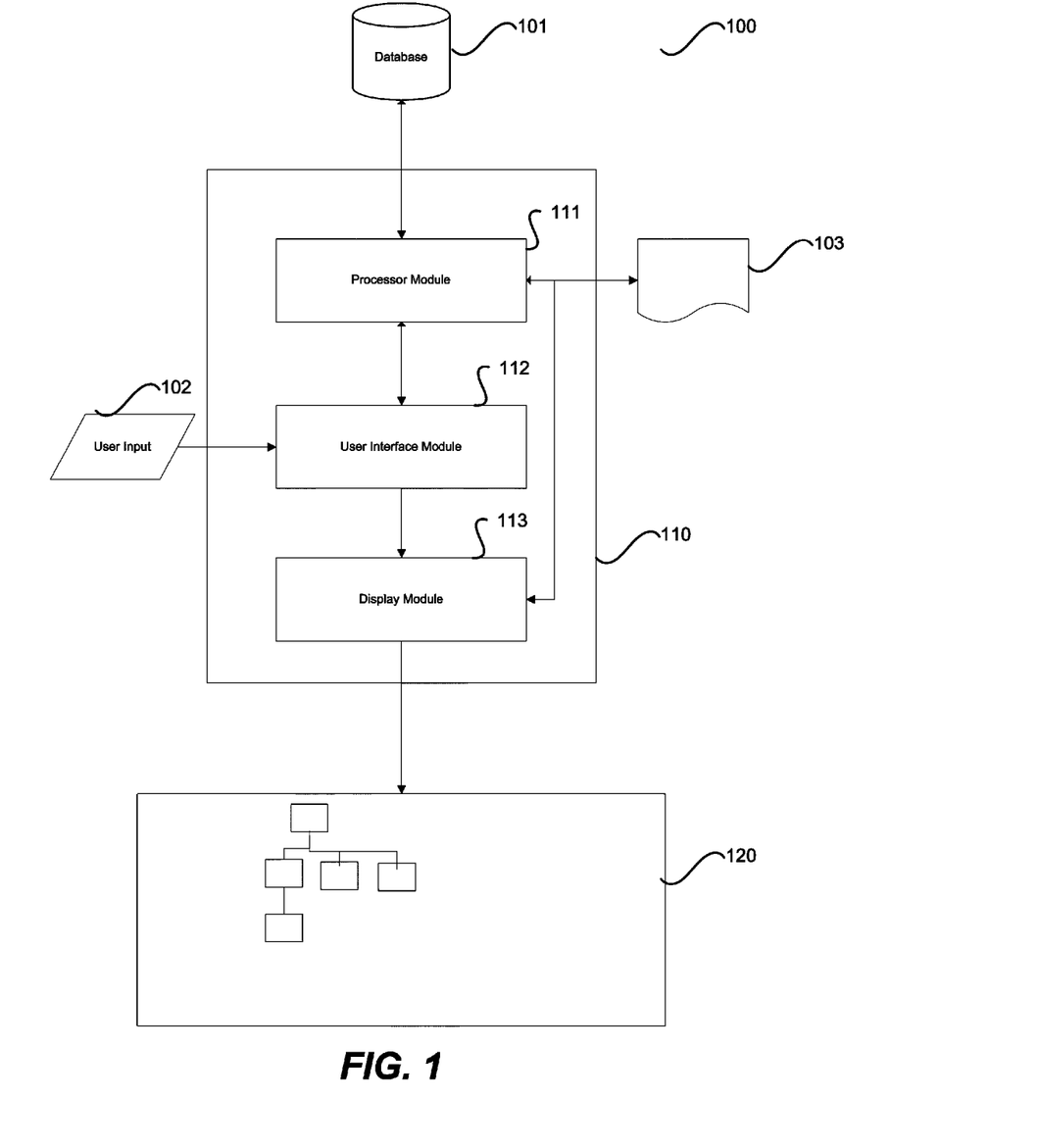
FIG. 1 is a simplified diagram illustrating data flow for processes according to embodiments of the present invention.

FIG. 1 is a simplified diagram illustrating data flow for processes according to embodiments of the present invention. This diagram is merely an example, which should not unduly limit the scope of the claims. One of ordinary skill in the art would recognize many variations, alternatives, and modifications.

As shown in FIG. 1, a system 100 includes the following components:
1. a database 101;
2. a processor module 111;
3. a user interface module 112;
4. a rendering module 113; and
5. a display 120.

As an example, the processor module 111, the user interface module 112, and the rendering module 113 are parts of a controller module 110.

The database 101 is connected to the controller module 110. Depending on the application, the database 101 may be implemented as structure data stored on a local memory device, such as a hard disk, flash memory, etc. In one embodiment, the database 101 is stored at a network location. In one embodiment, the database 101 is an integral part of the system 100.

Among other features, the database 101 stores data that represents various entities that are related to one another. The database 101 stores relationship data representing the relationship among these entities. Each of these entities is associated with one or more attributes. In one embodiment, the attributes are categorized. For example, an entity in the database 101 represents a manager in a personnel database, and the manager has attributes that include name, address, salary, title, etc. In various embodiments, the attributes of each of the entities can be used as filtering criteria.

The processor module 111 is configured to obtain information from the database 101. For example, the processor module 111 retrieves both entities data and relationship data mentioned above and processes these data. In various embodiments, the processor module 111 determines category and/or view information and attributes for each of the entities in the database. For example, during the filtering process, the processor stores the filtering criteria and the entities that meet the filtering criteria using the status indicator 103.

Once the processor module 111 processes the information from the database 101, the processor module 111 generates a hierarchical chart that is to be displayed on the display 120. As shown in FIG. 1, processor module 111 sends the hierarchical chart to the rendering module 113 for rendering on the display 120. As shown in FIG. 1, the display 120 is used to display the hierarchical chart. For example, the hierarchical chart includes a number of nodes and links. Each of the nodes represents an entity and/or concept that is stored in the database. The links among the nodes represent the relationship among the nodes. For example, if the status indicator 103 indicates that only a few nodes meet filtering criteria, the processor module 111 uses the information from these nodes in a hierarchical chart for display at a one display setting, and the nodes that did not meet the filtering criteria at a different display setting (e.g., dimmer, blurred, reduced size, etc.)

The controller module 110 as shown includes a user interface module 112 for receiving user inputs. When user input 102 is received, the display 120 updates accordingly. For example, when user input 102 indicates what filtering criteria should be used, the user input received by the user interface module 112 and processed by the processor module 111 does what?. The processor module 111 determines which nodes meet the filtering criteria and stores these nodes in the status indicator 103, and retrieves additional information from the database if necessary. The processor module 111 then generates an updated hierarchical chart, with one or more nodes changing the display setting (e.g., increased or decreased visibility levels). The updated hierarchical chart is then rendered by the rendering module 113 and displayed at the display 120.

Depending on the operational mode, the change of view for the nodes may work in different ways. In one exemplary scenario, the view for each node on the hierarchical chart is changed and synchronized to one specific view, if a view selection is made at a global menu and all of the nodes are selected for view change. On the other hand, if a user selects one or more nodes of the hierarchy, only the selected nodes will change the view. The detailed operation of displaying and updating the hierarchical chart is described in more detail below.

Figure 2:
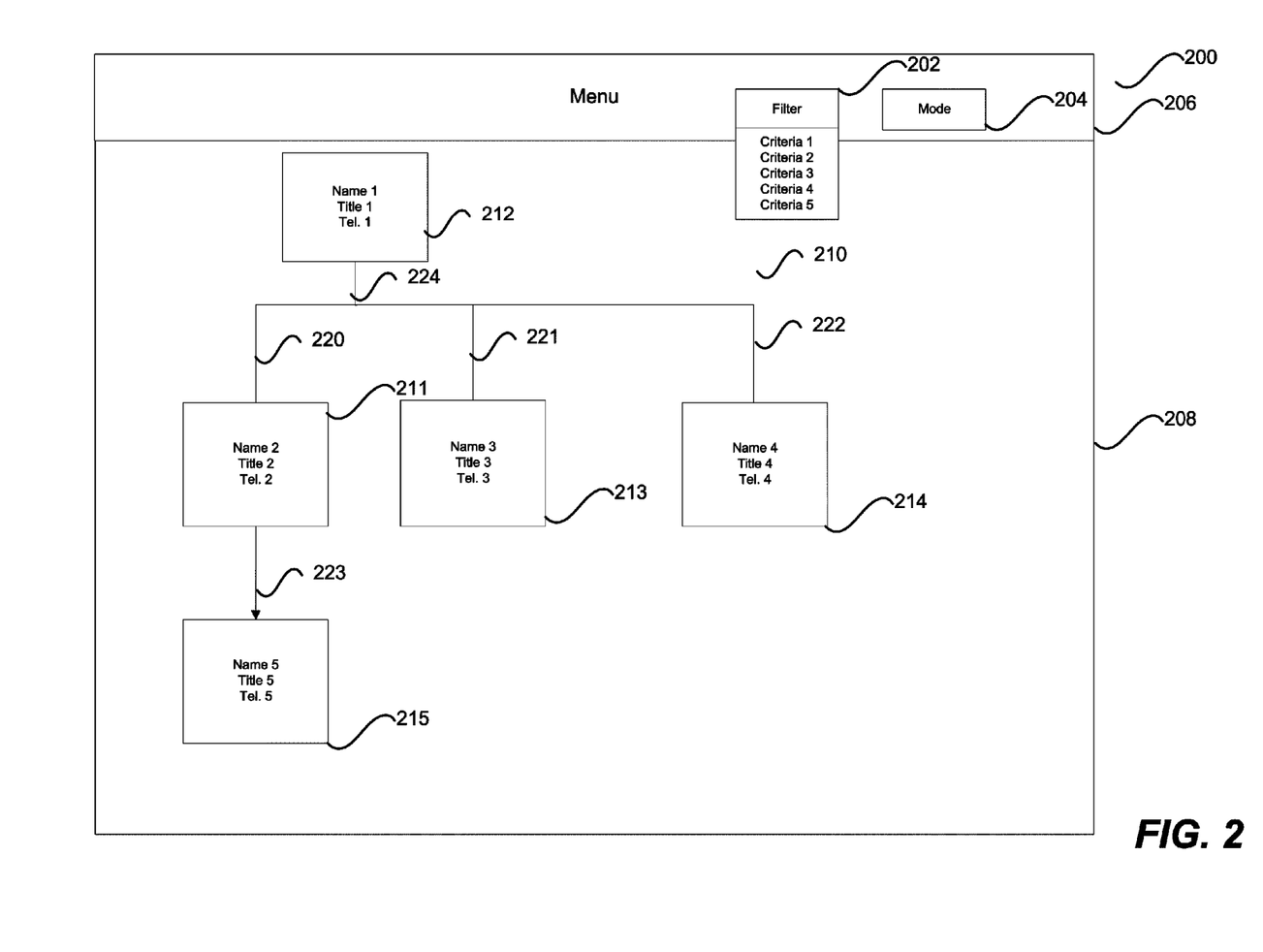
FIG. 2 is a simplified diagram illustrating a graphical user interface according to an embodiment of the present invention.

FIG. 2 is a simplified diagram illustrating a graphical user interface according to an embodiment of the present invention. This diagram is merely an example, which should not unduly limit the scope of the claims. One of ordinary skill in the art would recognize many variations, alternatives, and modifications.

A graphical user interface 200 is shown in FIG. 2A. The graphical user interface 200 contains a display region 208 and a menu region 206. The display region 208 displays a hierarchical chart 210. The menu region 206 typically comprises various user-selectable controls for performing various operations (not shown in FIG. 2) such as opening a file, copy and paste operations, etc. The operations may change depending on the specific application for which the graphical user interface is displayed.

The display region 208 is used for displaying hierarchical information. For example, as depicted in FIG. 2, display region 208 displays a hierarchical chart 210 comprising a plurality of nodes 211-215 and links 220-224 connecting the nodes. Each node represents a concept or entity involved in the hierarchy depicted by hierarchical chart 210. The links between the nodes represent hierarchical relationships between the concepts or entities represented by the nodes. For example, if hierarchical chart 210 represents an organization personnel hierarchy, the nodes of hierarchical chart 210 may represent persons involved in the hierarchy and the links may represent hierarchical relationships between the personnel. For example, node 212 may represent a director, nodes 211, 213, and 214 may represent managers under the director, and node 215 may represent an employee under the manager represented by node 211. Each node may display information related to the entity or concept represented by the node. For example, the nodes in FIG. 2 may display names (e.g., Name 1, Name 2, etc.) corresponding to the people represented by the nodes. It is to be understood that other information items may be displayed as well.

According to embodiments, nodes 211-215 in FIG. 2 correspond to records stored in a database. The records in the database relate to one another, and the relationship is stored in the database as relationship data. For example, the links 220-224 correspond to visualization on the graphical user interface 200 of the relationship data. To provide a more specific example, node 212 corresponds to a record of a director and nodes 211-214 correspond to records of managers under the director, and the records for both director and managers stored in the data contain the hierarchical relationship information. In addition to relationship data, the database also contains various attributes associated with each record. In one embodiment, each of the records stored in the data contains various fields for storing various attributes. Going back to the example above, the record that stores information for the director may contain attributes such as name, address, contact information, salary, availability, performance, etc. Similarly, the records for managers may contain information such as name, address, contact information, salary, availability, performance, hours worked, vacation time, etc.

In one embodiment, the graphical user interface 200 has a default setting for displaying all of nodes 211-215. For example, nodes 211-215 represent all of the nodes that are in the chart 210. Depending on the filtering criteria selected by the user, one or more of these nodes changes its visibility.

As shown in FIG. 2, the menu region 206 includes a filter menu 202. The filter menu 202 provides a number of filter criteria. For example, as shown in FIG. 2, the filter criteria 1-5 are based on the attributes associated with the nodes. In a specific embodiment, the filter criteria 1-5 are predefined. For example, when displaying a hierarchical chart that contains nodes associated with personnel data, filter criteria would include performance, full-time employees, etc. Similarly, in an exemplary hierarchical chart that contains nodes associated with production line information, filter criteria would include machine type, throughout threshold, etc. In one embodiment, filter criteria shown in the filter menu 202 are automatically determined by a computer program. For example, the computer program processes each of the records to determine their attributes and automatically generates the filter criteria based on the records and/or attributes.

Figure 3:
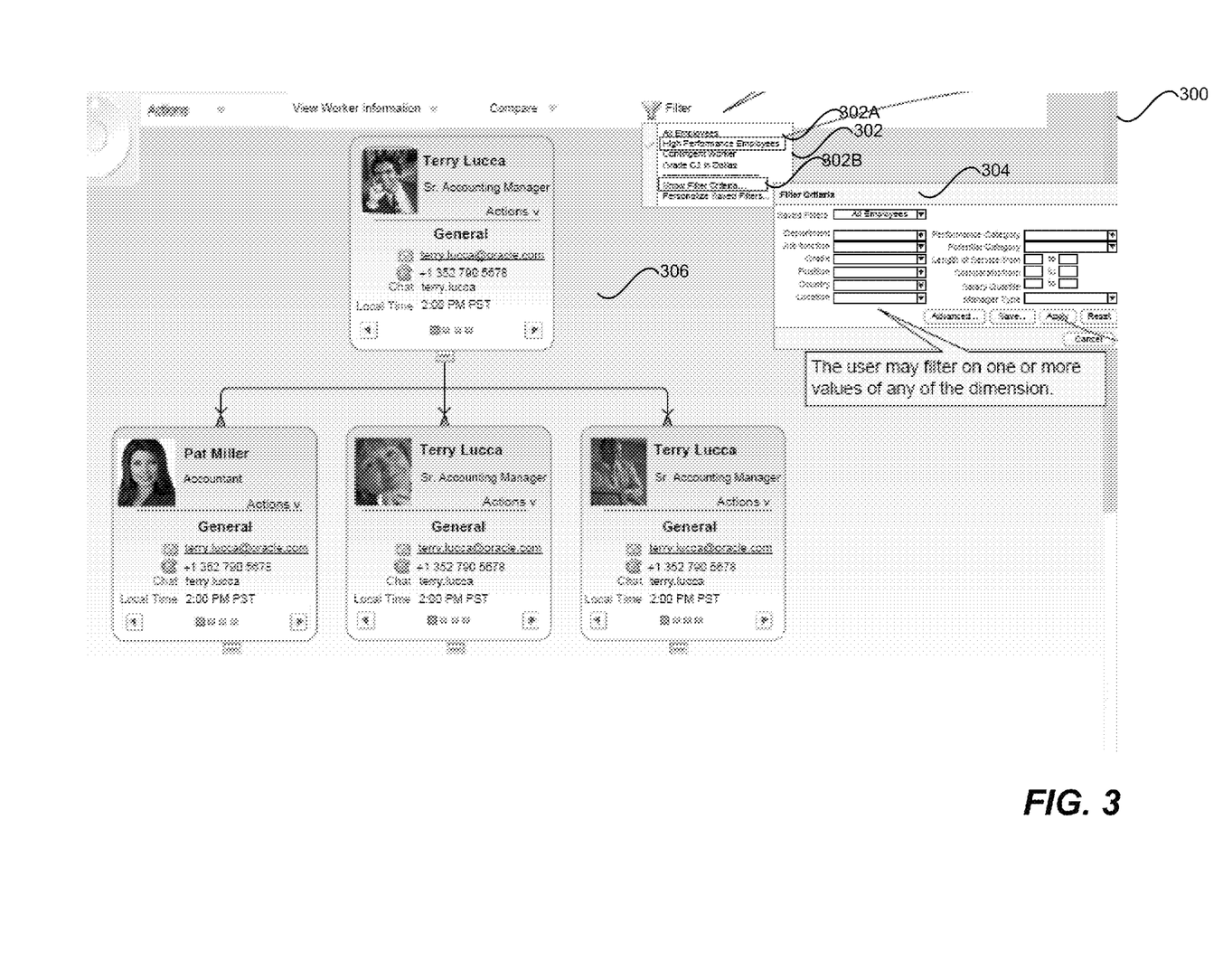
FIG. 3 is a screen shot of an exemplary graphical user interface according to an embodiment of the present invention.

According to various embodiments, filtering criteria may be user defined, as explained below. FIG. 3 is a screen shot of an exemplary graphical user interface according to an embodiment of the present invention. This diagram is merely an example, which should not unduly limit the scope of the claims. One of ordinary skill in the art would recognize many variations, alternatives, and modifications. In FIG. 3, the graphical user interface 300, on which a hierarchical chart 306 is displayed, includes a filter menu 302. Filter menu 302 includes a predefined menu selection 302A that is labeled "High Performance Employees." The filter menu 302 also includes a user filter selection 302B that allows users to set filtering criteria. As shown, the user filter selection 302B is labeled "Show Filter Criteria." When a user selects filter selection 302B, a window 304 appears, which allows users to manually input various filter criteria values, such as "Department," "Job function," "Length of Service," etc. Depending on the type of value, a user may select value from a drop down menu (e.g., "Department") or enter numerical (e.g., "Length of Service") and/or alphabetical values. As shown in FIG. 3, a user may enter more than one criterion in the window 304 to narrow down the filtering process.

Once the filtering criteria are defined, the program performs the filtering process to determine which nodes on the hierarchical chart meet the filtering criteria and which do not. Depending on the specific implementation, various types of filtering algorithms may be used. In an embodiment, a filtering algorithm according to the present invention retrieves and processes information associated with each of the nodes. For example, the filtering algorithm determines, one by one, whether a node meets the filtering criteria set by the user. After the filtering algorithm is completed, it generates a set of data indicating which nodes satisfy the filtering criteria and which do not.

Figure 4:
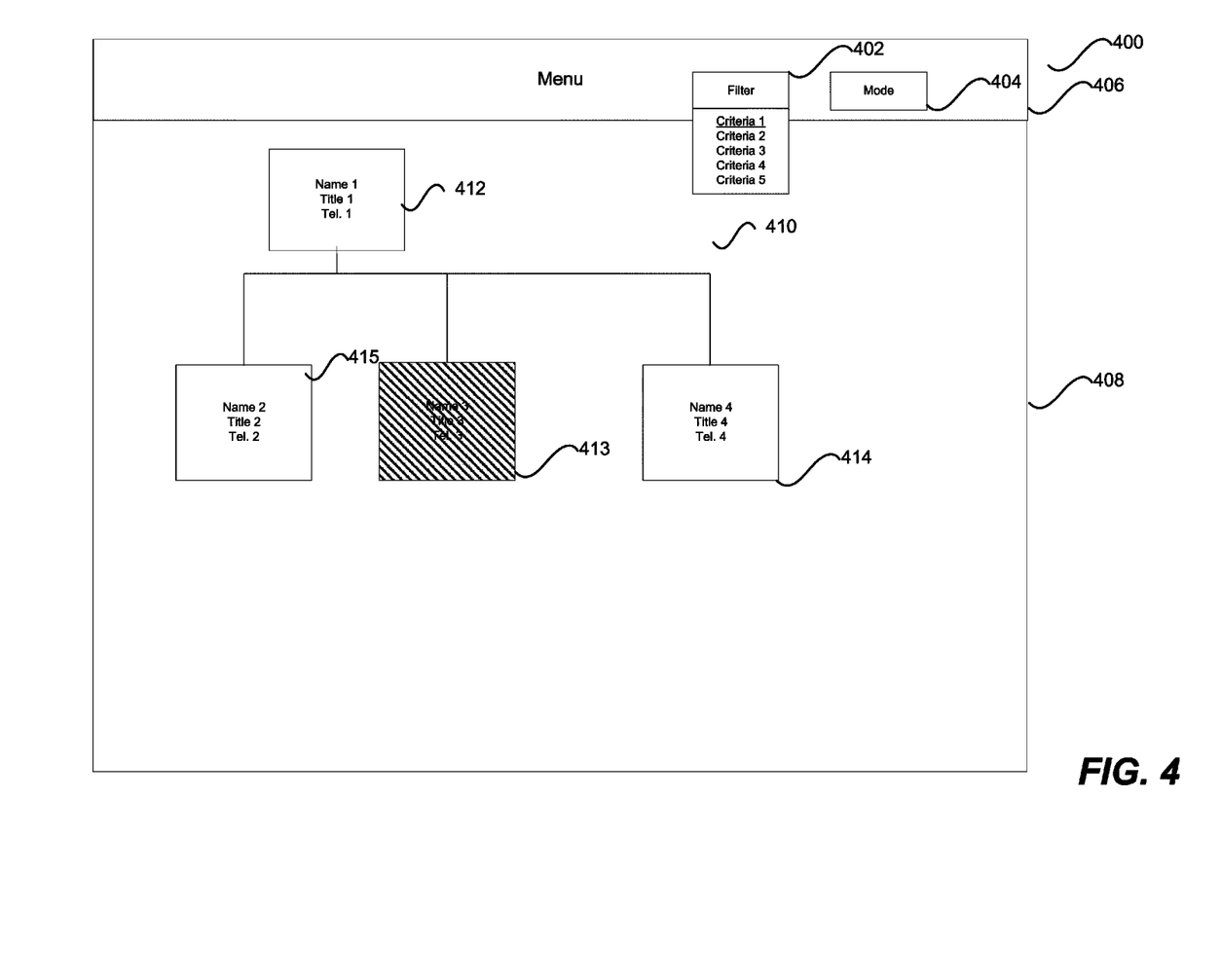
FIG. 4 is a simplified diagram illustrating a filtered display of a hierarchical chart according to an embodiment of the present invention.

It is to be appreciated that embodiments of the present invention provide a user friendly graphical user interface. In various embodiments, the hierarchical relationships among the nodes are maintained while illustrating filtering results on the graphical user interface. FIG. 4 is a simplified diagram illustrating a filtered display of a hierarchical chart according to an embodiment of the present invention. This diagram is merely an example, which should not unduly limit the scope of the claims. One of ordinary skill in the art would recognize many variations, alternatives, and modifications.

As shown in FIG. 4, a graphical user interface 400 includes a display region 408 and a menu region 406. The display region 408 displays a hierarchical chart 410. The hierarchical chart 410 includes nodes 412-415. As explained above, each node represents a concept or entity involved in the hierarchy depicted by hierarchical chart 410. For example, each node is a representation of a record stored in a database. The links between the nodes represent hierarchical relationships between the concepts or entities represented by the nodes. For example, if hierarchical chart 410 represents an organization personnel hierarchy, the nodes of hierarchical chart 410 may represent persons involved in the hierarchy and the links may represent hierarchical relationships between the personnel.

The menu region 406 includes a filter menu 402. A user is able to use the filter menu 402 to select one or more filtering criteria. For example, the user selects "Criteria 1" (e.g., user selection indicated by the underline) in the filter menu 402. To provide an example, node 413 does not meet "Criteria 1" and is thus filtered out. Under conventional filtering schemes, node 413 would disappear from the GUI. In contrast, node 413, which is filtered out, is still displayed at the GUI and the hierarchical relationship of the hierarchical chart 410 remains unchanged. Depending on the application, there may be other ways to illustrate the filtering of nodes. In FIG. 4, node 413 that does not meet the filtering criteria is displayed as a shaded node, which makes node 413 less visible than the other nodes on the hierarchical chart. But it is to be understood that node 413 may be displayed at a low visibility level (compared to nodes that meet filtering criteria) in other ways, such as reduced size, blurred image, dimmed, etc. The links among the nodes are maintained, even for node 413. It is to be appreciated that by maintaining the links, the hierarchical relationship among the nodes is maintained and visible.

Figure 5:
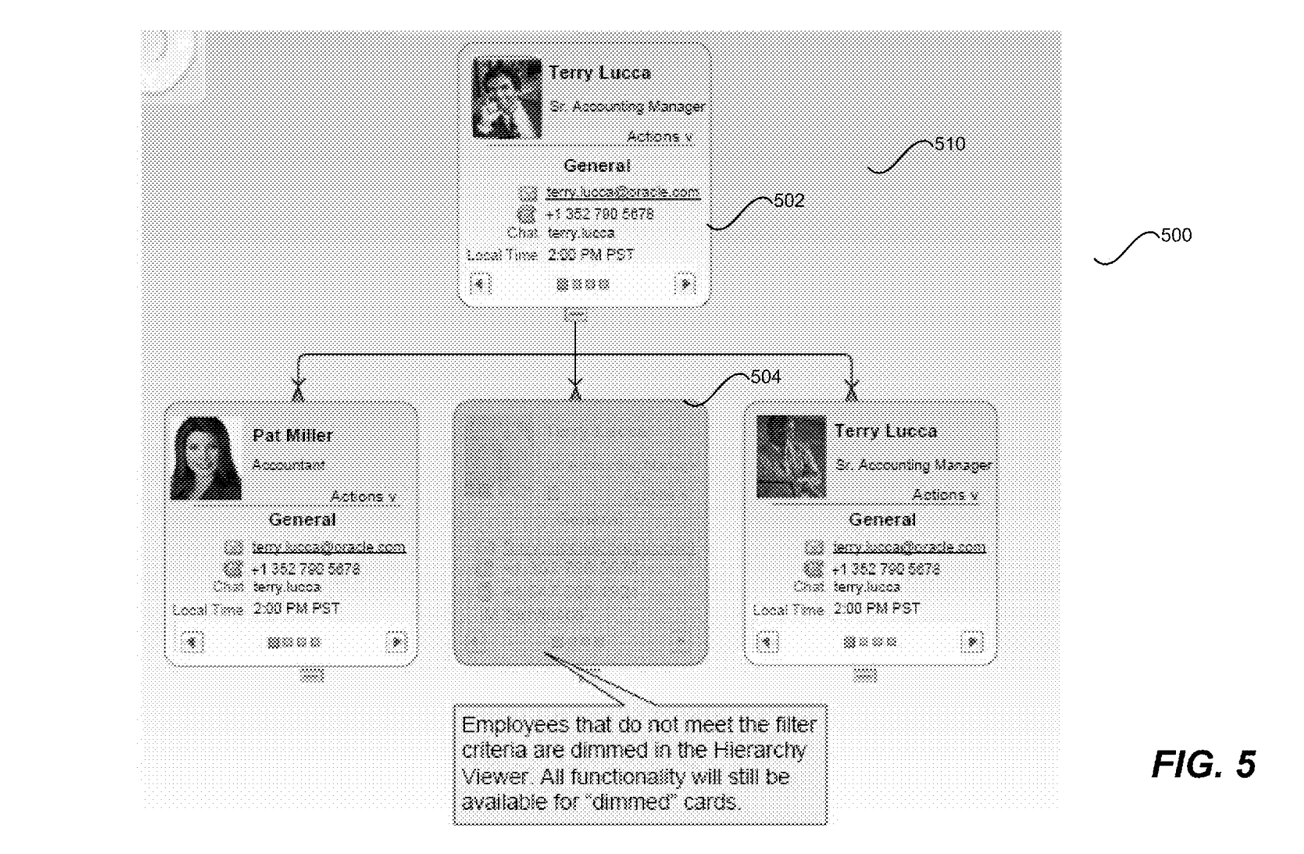
FIG. 5 is an exemplary screen shot of a hierarchical display where filtered results are displayed according to embodiments of the present invention.

FIG. 5 is an exemplary screen shot of a hierarchical display where filter results are displayed according to embodiments of the present invention. This diagram is merely an example, which should not unduly limit the scope of the claims. One of ordinary skill in the art would recognize many variations, alternatives, and modifications. In the screen shot 500, the hierarchical chart 510 shows that node 504 that does not fit filtering criteria being dimmed. The nodes that meet the filtering criteria, such as node 502, remain visible.

Figure 6:
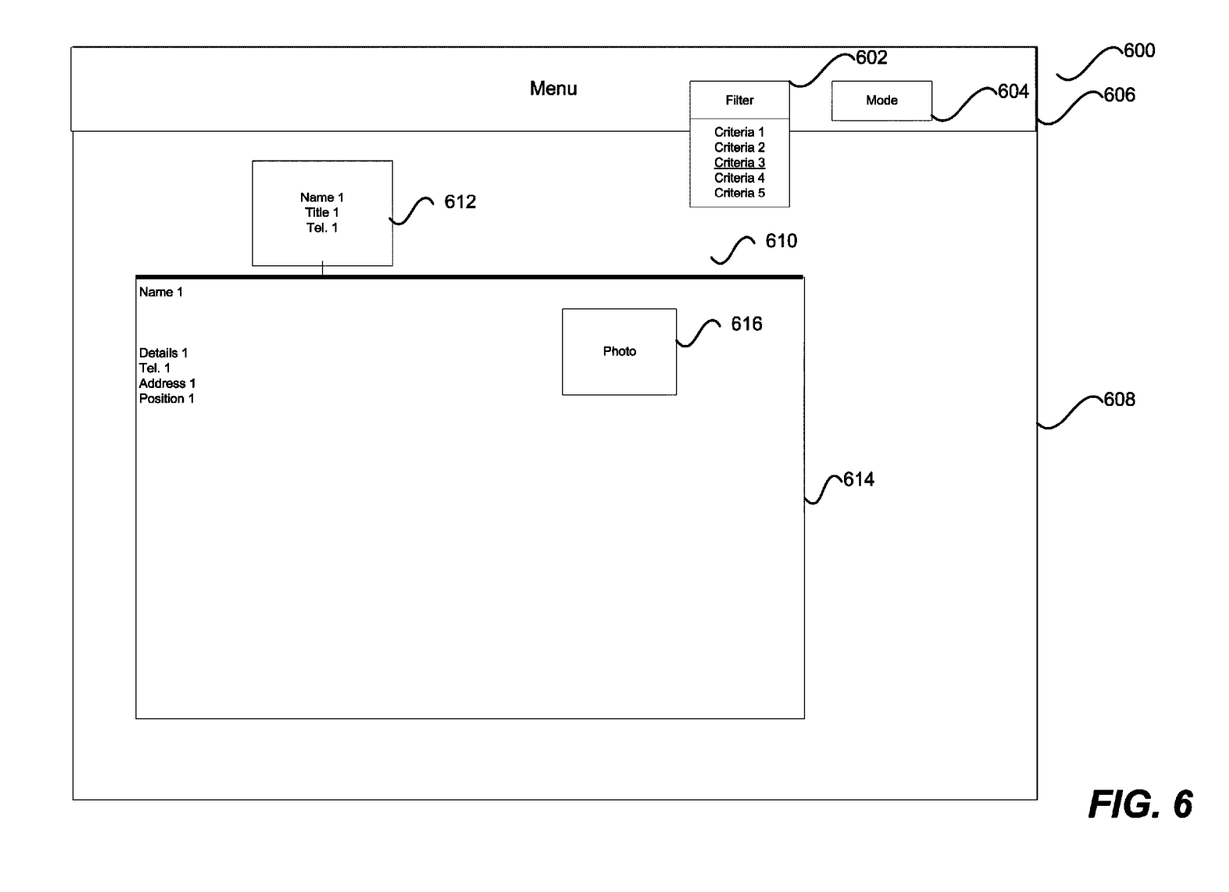
FIG. 6 is a simplified diagram illustrating the display of a filtered hierarchy according to an embodiment of the invention.

In a specific embodiment, the node that meets the filtering criteria is displayed at an enlarged size. FIG. 6 is a simplified diagram illustrating the display of a filtered hierarchy according to an embodiment of the invention. This diagram is merely an example, which should not unduly limit the scope of the claims. One of ordinary skill in the art would recognize many variations, alternatives, and modifications. As shown in FIG. 6, "Criteria 3" is selected at the filter menu 602. For example, also in the menu region 606 is the filtering mode menu 604. In FIG. 6, node 614 is displayed within display region 608. For example, node 614 is displayed at a larger size compared to node 612, as node 614 meets the filtering criteria while node 612 does not. A photo 616 is displayed on node 614, as the large display size of node 614 affords area for photo display. It is to be appreciated, as shown in FIG. 6, that node 614 is still connected to node 612 through a link, and that hierarchical relationship among nodes is preserved and displayed.

Figure 7:
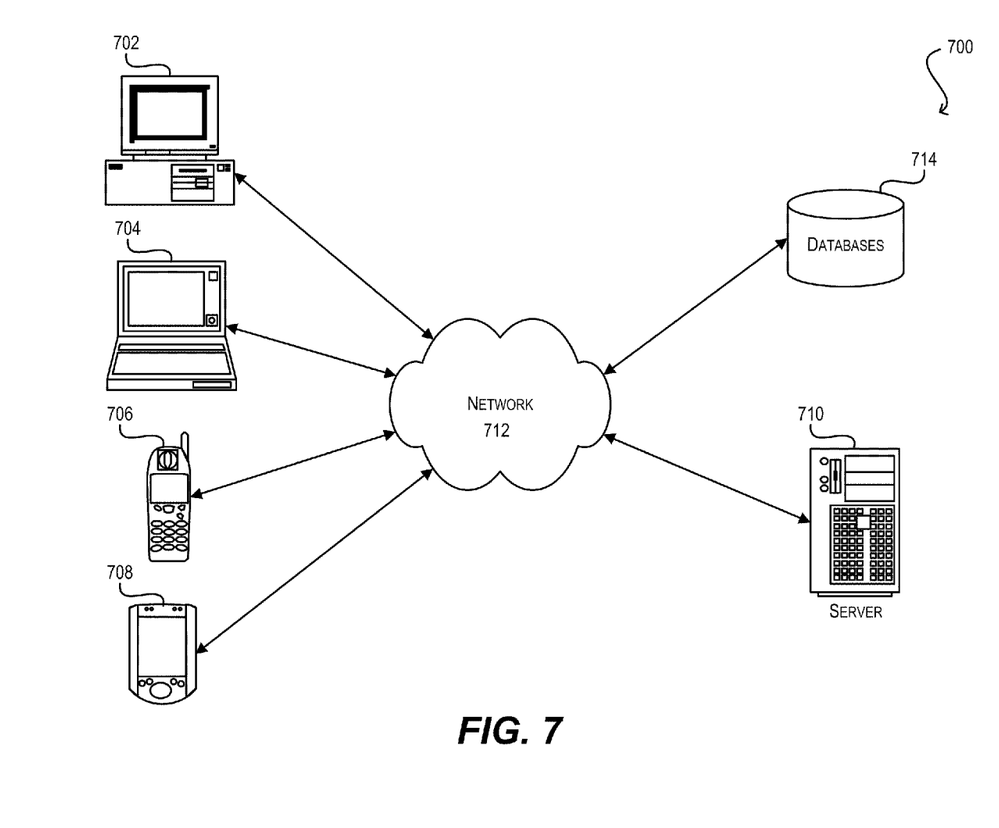
FIG. 7 is a simplified diagram illustrating a system for implementing various embodiments of the present invention.

FIG. 7 is a simplified diagram illustrating a system for implementing various embodiments of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, 708 communicatively coupled with a server computer 710 via a network 712. In one set of embodiments, client computing devices 702, 704, 706, 708 may request service from the server computer 710.

Client computing devices 702, 704, 706, 708 may be general purpose personal computers (including, for example, personal computers and/or laptop computers running various versions of Microsoft Windows™ and/or Apple Macintosh™ operating systems), cell phones or PDAs (running software such as Microsoft Windows Mobile™ and being Internet, e-mail, SMS, Blackberry™, and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic devices capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any variety of server applications and/or mid-tier applications, including web servers, Java™ virtual machines, application servers, database servers, and the like. In various embodiments, server computer 710 is adapted to run one or more Web services or software applications described in the foregoing disclosure. For example, server computer 710 may provide the abovementioned graphic user interface for displaying hierarchical information and filtering of nodes.

As shown, client computing devices 702, 704, 706, 708 and server computer 710 are communicatively coupled via network 712. Network 712 may be any type of network that can support data communications using any variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infrared network; a wireless network (e.g., a network operating under any of the IEEE 802.11 suite of protocols, the Bluetooth™ protocol known in the art, and/or any other wireless protocols); and/or any combination of these and/or other networks.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or residing in) one or more of the client computing devices 702, 704, 706, 708, 710. Alternatively, database 714 may be remote from any or all of the client computing devices 702, 704, 706, 708, 710 and/or in communication (e.g., via network 712) with one or more of these. In one set of embodiments, database 714 may reside in a storage-area network (SAN) familiar to those skilled in the art. Similarly, any necessary files for performing the functions attributed to the client computing devices 702, 704, 706, 708, 710 may be stored locally on the respective computer and/or remotely on database 714, as appropriate. As an example, data represented by nodes on a hierarchical chart and the relational data thereof are stored at the database 714.

Figure 8:
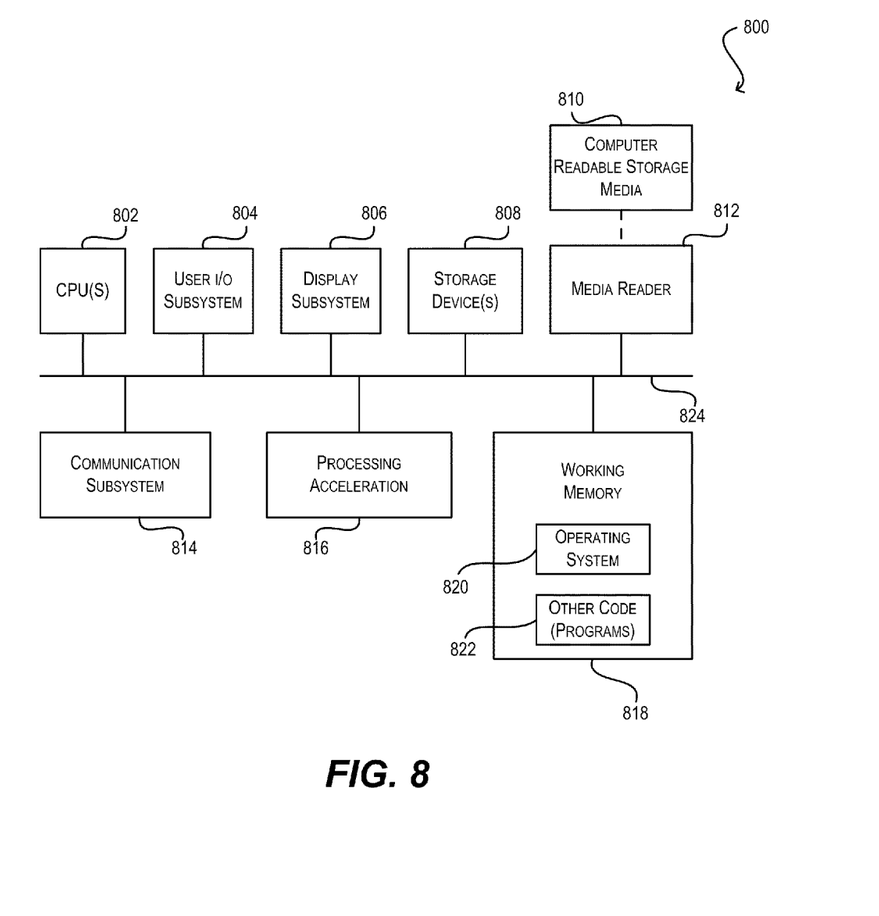
FIG. 8 is a simplified block diagram illustrating physical components of a computer system 800 that may be used in accordance with an embodiment of the present invention.

FIG. 8 is a simplified block diagram illustrating physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the client computing devices 702, 704, 706, 708, 710 illustrated in system environment 700 described above. As shown in FIG. 8, computer system 800 comprises hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). For example, the input device 804 is used to receive user inputs. Computer system 800 may also include one or more storage devices 808. By way of example, storage devices 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage device 808. For example, the central processing unit 802 is configured to process filtering nodes based on user requests.

Computer system 800 may additionally include a computer-readable storage media reader 812, a communications subsystem 814 (e.g., a modem, a network card (wireless or wired), an infrared communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage devices 808) comprehensively representing remote, local, fixed, and/or removable storage devices plus storage media for temporarily and/or more permanently containing computer-readable information. Communications subsystem 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable codes and associated data structures for one or more of the design-time or runtime components/services illustrated in FIGS. 2 and 4. It should be appreciated that alternative embodiments of computer system 800 may have numerous variations from that described above. For example, customized hardware might also be used and/or particular elements might be implemented in hardware, software (including portable software, such as Applets™), or both. Further, connection to other computing devices such as network input/output devices may be employed. In various embodiments, the process for filtering and displaying nodes described throughout the present application is implemented as software elements of the computer system 800.

In one set of embodiments, the techniques described herein may be implemented as program code executable by a computer system (such as a computer system 800) and may be stored on machine-readable media. Machine-readable media may include any appropriate media known or used in the art, including storage media and communication media, such as, but not limited to, volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store or transmit the desired information and which can be accessed by a computer.

Figure 9:
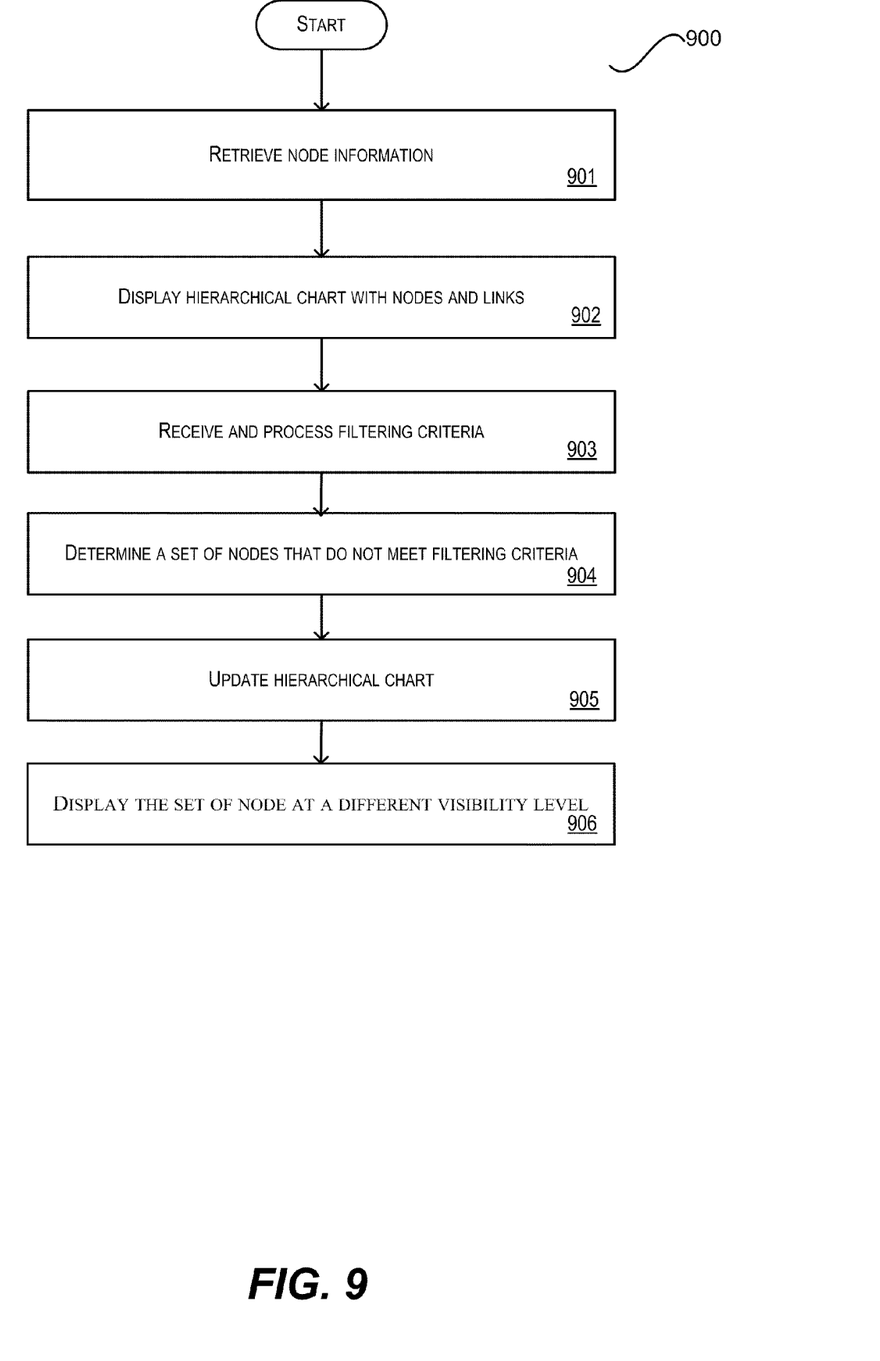
FIG. 9 is a simplified flow diagram illustrating the process of displaying a hierarchical chart with filter nodes according to embodiments of the present invention.

FIG. 9 is a simplified flow diagram illustrating a process of displaying a hierarchical chart with filter nodes according to embodiments of the present invention. This diagram is merely an example, which should not unduly limit the scope of the claims. One of ordinary skill in the art would recognize many variations, alternatives, and modifications. For example, various steps as shown in process 900 may be added, removed, replaced, rearranged, repeated, modified, and/or overlapped.

At step 901, node information is retrieved. For example, the node information includes information regarding entities represented by the nodes and relationship data thereof. At step 902, a hierarchical chart is displayed. On the hierarchical chart, nodes are displayed and the relationship among the nodes is displayed as links connecting the nodes.

At step 903, filtering criteria are received and processed. For example, the filtering criteria is provided by the user. Based on the filtering criteria, it can be determined which nodes meet the filtering criteria and which do not, at step 904. At step 905, the hierarchical chart is updated based on the results from filtering. At step 906, the nodes that do not meet the filtering criteria are displayed at a different visibility level (e.g., blurred, shaded, resized, etc.) compared to nodes that meet the filtering criteria. According to various embodiments, all of the nodes and their links are displayed before and after the filtering. For example, the hierarchical chart that has a filtered node still retains its hierarchy, as the nodes that did not meet the filtering criteria remain displayed on the hierarchical chart, only at a different visibility level.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer-readable storage medium storing a plurality of codes for controlling a processor to provide a graphical user interface, the plurality of codes comprising:
   code for obtaining information containing relationship data associated with entities represented as nodes of a hierarchical chart, each of the nodes associated with a plurality of attributes;
   code for receiving a first filtering criterion, the first filtering criterion being associated with at least a first attribute;
   code for displaying the hierarchical chart in a display region, the hierarchical chart based on at least the relationship data, each of the nodes being displayed at a first visibility level, the hierarchical chart including one or more links connecting the nodes, the one or more links being based on the relationship data;
   code for processing a first user input received by a user interface device, the first user selecting at least a first filtering criterion;
   code for processing the plurality of nodes;
   code for comparing the plurality of nodes to at least the first attribute;
   code for determined whether one or more nodes are associated with at least the first attribute;
   code for displaying the one or more nodes at a second visibility level on the hierarchical chart if the one or more nodes are determined to fail to associate with at least the first attribute, the second visibility level being characterized by a lowered visibility compared to the first visibility level;
   code for receiving a selection of at least one node in the hierarchical chart;
   code for displaying nodes in the hierarchical chart related to the at least one node, wherein the related nodes are configured to provide a selection menu of actions that are uniquely associated with at least one node, wherein the actions include updating the nodes that are being displayed;
   code for receiving a user input, wherein the user input includes selecting one or more nodes from the updated nodes being displayed, and wherein the user input further includes designating one or more related nodes to the one or more selected nodes;
   code for processing the user input; and
   code for displaying the one or more selected nodes and the one or more related nodes as a separate hierarchal chart.

2. The computer-readable storage medium of claim 1 further comprising:
   code for determining attributes associated with the plurality of nodes; and
   code for generating a plurality of filtering criteria based on the attributes.

3. The computer-readable storage medium of claim 1 further comprising code for defining a menu region and a display region within a graphical user interface, the menu region including a global selection menu, the global selection menu including selections for at least the first filtering criterion, the first filtering criterion being associated with at least a first attribute.

4. The computer-readable storage medium of claim 1 further comprising:
   code for determining a set of nodes matches with the first attribute; and
   code for displaying the set of nodes at a third visibility level, the third visibility level being characterized by a higher visibility compared to the first visibility level.

5. The computer-readable storage medium of claim 1 wherein nodes are opaque at the second visibility level.

6. The computer-readable storage medium of claim 1 wherein the nodes are characterized by a reduced size at the second visibility level.

7. The computer-readable storage medium of claim 1 wherein first filtering criterion is predefined.

8. The computer-readable storage medium of claim 1 wherein the global selection menu further including selections for a user defined filtering criteria.

9. The computer-readable storage medium of claim 1 wherein the one or more nodes are blurred at the second visibility level.

10. The computer-readable storage medium of claim 1 wherein the nodes are overlaid by a semi-transparent layer at the second visibility level.

11. The computer-readable storage medium of claim 1 further comprising code for receiving a second user input for defining a second attribute.

12. The method of claim 1 wherein the links remain unchanged when one or more nodes are displayed at a second visibility level.

13. A computer system for providing an interactive graphical user interface, the system comprising:
   a graphical user interface including a display, the display including a menu region and a display region within the graphical user interface, the menu region including a filtering menu, the filtering menu including selections for at least a first filtering criterion, the first filtering criterion being associated with at least a first attribute, the display region being adapted to display a plurality of nodes of a hierarchical chart at a first visibility level based on relationship data, the plurality of nodes being connected by one or more links based on the relationship data, the plurality of nodes being associated with a plurality of attributes;
   a memory;
   an input module for receiving user inputs, the input module being configured to receive a user selection for selecting the first filtering criterion from the filtering menu; and
   a processor, the processor being configured to obtain nodes and process the user input to determine a whether one or more nodes fail to associate with at least the first attribute;
   wherein:
      the display region is updated to display the one or more nodes at a second visibility level on the hierarchical chart if the one or more nodes are determined to fail to associate with at least the first attribute, the second visibility level being characterized by a lowered visibility compared to the first visibility level; and
   wherein the processor is further configured to:
      receive a selection of at least one node in the hierarchical chart;
      display nodes in the hierarchical chart related to the at least one node, wherein the related nodes are configured to provide a selection menu of actions that are uniquely associated with at least one node, wherein the actions include updating the nodes that are being displayed;

receive a user input, wherein the user input includes selecting one or more nodes from the updated nodes being displayed, and wherein the user input further includes designating one or more related nodes to the one or more selected nodes;

process the user input; and display the one or more selected nodes and the one or more related nodes as a separate hierarchal chart.

14. The system of claim 13 wherein the input module comprises a pointing device for selecting the first filtering criterion.

15. The system of claim 13 wherein the input module comprises a keyboard device for receiving user inputs specifying one or more filtering criteria.

16. The system of claim 13 further comprising a storage for storing a database, the plurality of nodes corresponding to information entities stored at the database.

17. The system of claim 13 further comprising a network interface for retrieving the nodes from a network source.

18. In a computer system having a processor, a graphical user interface including a display and a user interface device communicatively coupled to the processor, the graphical user interface comprising:

a display region within the graphical user interface, the display region being adapted to display one or more links and a plurality nodes of a hierarchical chart at a first visibility level based on at least relationship data, the relationship data associated the plurality of nodes, the plurality of nodes being associated with a plurality of attributes; and a menu region, the menu region including a filtering menu, the filtering menu including selections for at least a first filtering criterion, the first filtering criterion being associated with at least a first attribute;

wherein:

user interface device is configured to receive a first user input, the first user selecting the first filtering criterion;

the processor is configured to process the plurality of nodes and compare plurality of nodes to at least the first attribute;

the display region is updated for displaying one or more nodes at a second visibility level on the hierarchical chart if the one or more nodes are determined to fail to associate with at least the first attribute, the second visibility level being characterized by a lowered visibility compared to the first visibility level;

the processor is further configured to receive a selection of at least one node in the hierarchical chart, and display nodes in the hierarchical chart related to the at least one node, wherein the related nodes are configured to provide a selection menu of actions that are uniquely associated with at least one node, wherein the actions include updating the nodes that are being displayed;

receive a user input, wherein the user input includes selecting one or more nodes from the updated nodes being displayed, and wherein the user input further includes designating one or more related nodes to the one or more selected nodes;

process the user input; and display the one or more selected nodes and the one or more related nodes as a separate hierarchal chart.

19. The graphical user interface of claim 18 wherein the filtering menu comprises a dropdown menu.

20. The graphical user interface of claim 18 wherein the filtering menu comprises a text input box.

21. The graphical user interface of claim 18 wherein the one or more nodes are opaque at the second visibility level.

\* \* \* \* \*

UNITED STATES PATENT AND TRADEMARK OFFICE
CERTIFICATE OF CORRECTION

| | |
|---|---|
| PATENT NO. | : 8,863,029 B2 |
| APPLICATION NO. | : 12/563085 |
| DATED | : October 14, 2014 |
| INVENTOR(S) | : Chen et al. |

Page 1 of 1

It is certified that error appears in the above-identified patent and that said Letters Patent is hereby corrected as shown below:

In the Claims

In column 12, line 27, in Claim 12, delete "method" insert -- computer-readable storage medium --, therefor.

In column 12, line 49, in Claim 13, delete "determine a whether" and insert -- determine whether --, therefor.

In column 13, line 29, in Claim 18, delete "associated the" and insert -- associated with the --, therefor.

Signed and Sealed this
Twenty-eighth Day of July, 2015

Michelle K. Lee
*Director of the United States Patent and Trademark Office*